US005586698A

United States Patent [19]
Satoh

[11] Patent Number: 5,586,698
[45] Date of Patent: Dec. 24, 1996

[54] AUTOMOTIVE TOOL STORAGE DEVICE

[75] Inventor: Hideto Satoh, Hamamatsu, Japan

[73] Assignee: Suzuki Motor Corporation, Japan

[21] Appl. No.: 444,442

[22] Filed: May 19, 1995

[30] Foreign Application Priority Data

May 30, 1994 [JP] Japan ................................. 6-116131

[51] Int. Cl.⁶ ............................................. B62D 43/00
[52] U.S. Cl. .................................. 224/42.24; 224/42.12; 224/42.13; 296/37.2
[58] Field of Search ................. 224/42.12, 42.13, 224/42.14, 42.2, 42.21, 42.23, 42.24; 296/37.2, 37.3; 248/205.1

[56] References Cited

U.S. PATENT DOCUMENTS

| 1,616,155 | 2/1927 | Uebelmesser | 224/42.13 |
| 2,036,472 | 4/1936 | Grimshaw | 224/42.13 |
| 2,321,239 | 6/1943 | Pond | 224/42.24 |
| 2,813,671 | 11/1957 | Gill | 224/42.13 |
| 2,831,622 | 4/1958 | Bacca | 224/42.24 |
| 4,598,848 | 7/1986 | Clark | 224/42.12 |
| 4,738,382 | 4/1988 | Natori | 224/42.24 |
| 4,771,926 | 9/1988 | Anderson et al. | 224/42.13 |

FOREIGN PATENT DOCUMENTS

| 1081840 | 12/1954 | France | 296/37.2 |
| 2657836 | 8/1991 | France | 224/42.2 |
| 79630 | 11/1955 | Netherlands | 224/42.13 |

*Primary Examiner*—Henry J. Recla
*Assistant Examiner*—Gregory M. Vidovich
*Attorney, Agent, or Firm*—Law Office of Timothy N. Trop

[57] ABSTRACT

An object of the present invention is to provide an automotive tool storage device which can prevent the occurrence of noise and damage due to a tool and is convenient in use of tools. According to the present invention, in the automotive tool storage device in which a spare tire is fixed to the car body by using a spare tire holder, a tool is fixed together with the spare tire by using a tool holder having a concave portion which is open downward at the lower part thereof, by positioning the tool in the concave portion of the tool holder, and by holding the tool between a wheel hub of the spare tire and the tool holder.

3 Claims, 6 Drawing Sheets

5,586,698

AUTOMOTIVE TOOL STORAGE DEVICE

FIELD OF THE INVENTION AND RELATED ART STATEMENT

The present invention relates to an automotive tool storage device.

The conventional method for storing a wheel wrench 1 in an automobile is to put the wheel wrench 1, which has been placed in a vinyl bag 2, in a vacant space in the space on a rear floor 3 where a spare tire 4 is stored.

With this method, however, if the rear floor 3 vibrates during the running of the automobile, the wheel wrench 1 is brought into contact with the rear floor 3 or other parts, which causes noise and damage.

Also, since the wheel wrench 1 is not fixed to a fixed position, it moves during the running of the automobile, so that it must be looked for when needed, which presents a problem of inconvenience in use.

OBJECT AND SUMMARY OF THE INVENTION

The present invention was made to solve the above problems. Accordingly, an object of the present invention is to provide an automotive tool storage device which can prevent the occurrence of noise and damage due to a tool and is convenient in use of tool.

According to the present invention, to achieve the above object, in the automotive tool storage device in which a spare tire is fixed to the car body by using a spare tire holder, a tool is fixed together with the spare tire by using a tool holder-having a concave portion which is open downward at the lower part thereof, by positioning the tool in the concave portion of the tool holder, and by holding the tool between a wheel hub of the spare tire and the tool holder.

DETAILED DESCRIPTION OF PREFERRED EMBODIMENTS

Figure 1:
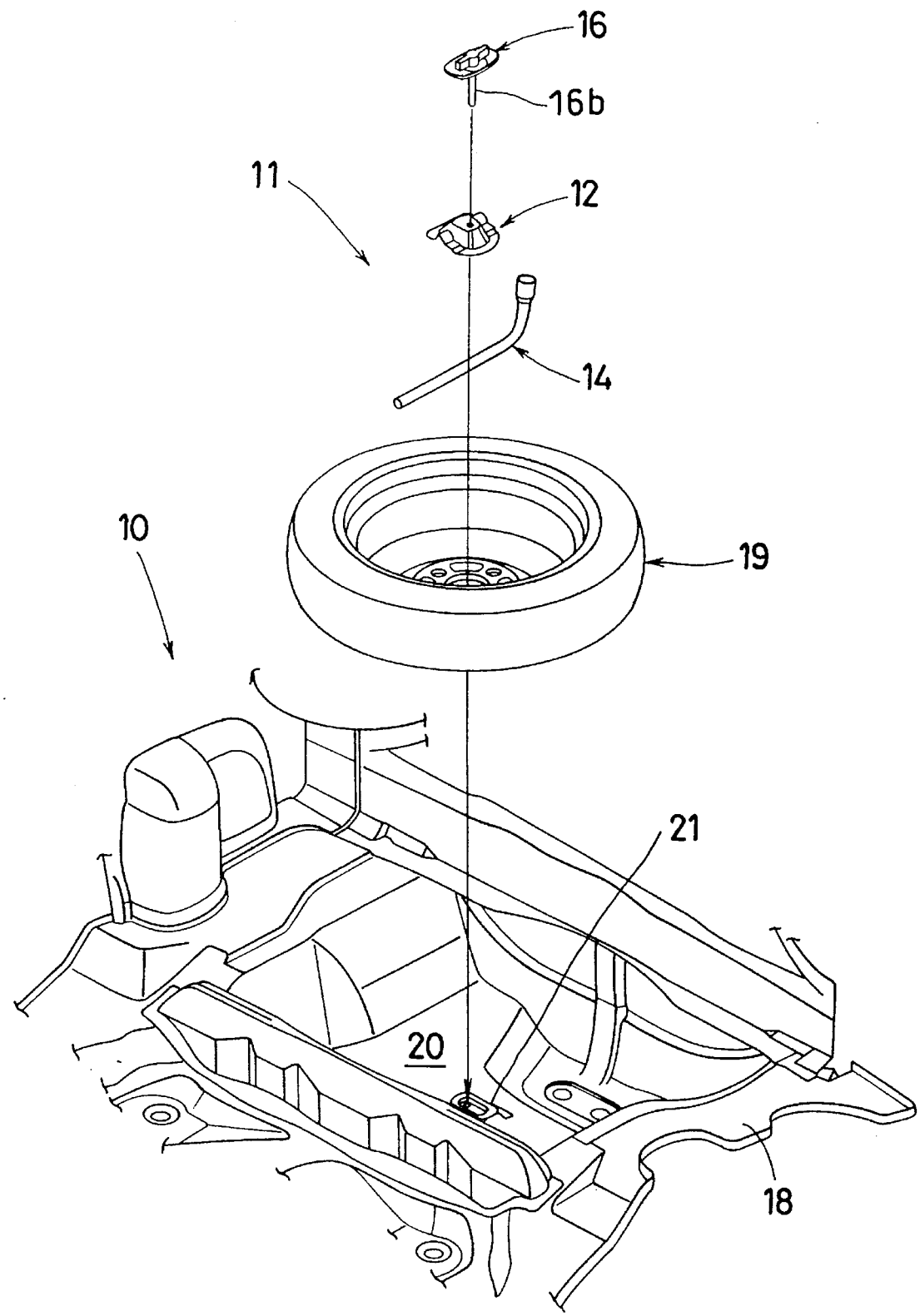
FIG. 1 is an exploded perspective view showing one embodiment of an automotive tool storage device in accordance with the present invention.
Figure 2:
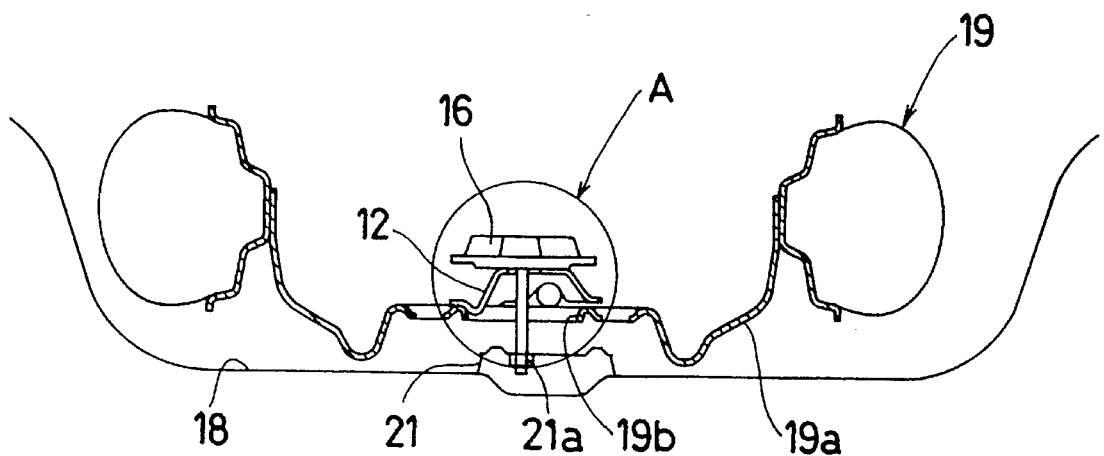
FIG. 2 is a sectional view showing the principal part of one embodiment of an automotive tool storage device in accordance with the present invention.

One embodiment of an automotive tool storage device in accordance with the present invention will be described in detail with reference to the accompanying drawings. FIGS. 1 to 8 show one embodiment of an automotive tool storage device in accordance with the present invention.

In this embodiment, a wheel wrench storage device 11 for an automobile 10 uses a wheel wrench holder 12 as shown in FIGS. 5 to 8.

The wheel wrench holder 12 has a concave portion 13, which is open downward, at the lower part of the body 12a. The concave portion 13 is formed so as to have a size such that a handle portion 14a of a wheel wrench 14 can be contained therein.

Figure 5:
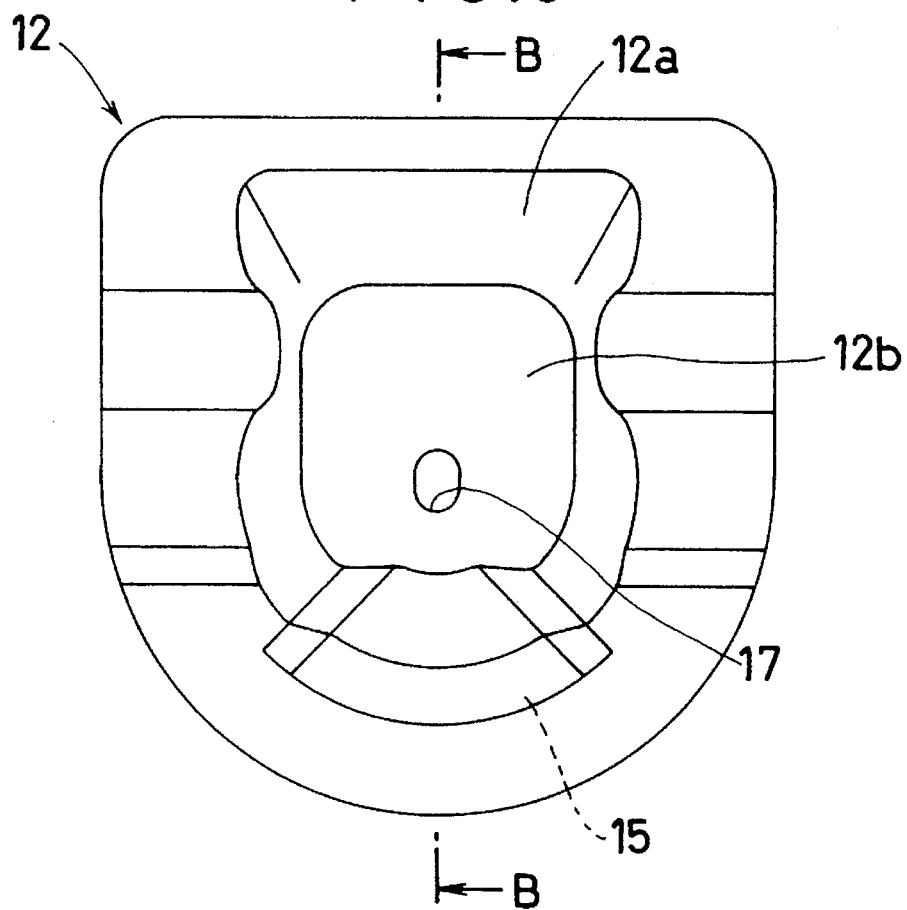
FIG. 5 is a plan view of a wheel wrench holder used in one embodiment of an automotive tool storage device in accordance with the present invention.
Figure 6:
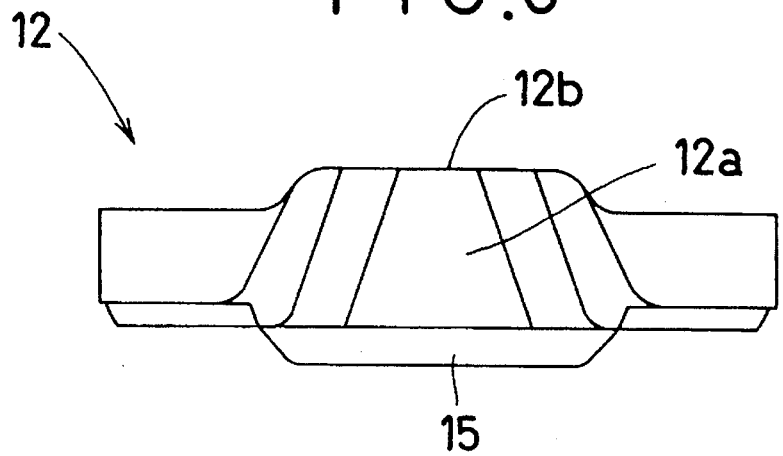
FIG. 6 is a front view of a wheel wrench holder used in one embodiment of an automotive tool storage device in accordance with the present invention.
Figure 7:
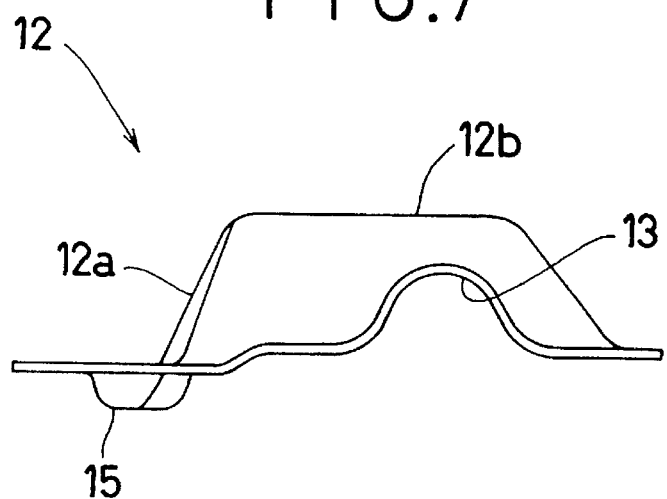
FIG. 7 is a right side view of a wheel wrench holder used in one embodiment of an automotive tool storage device in accordance with the present invention.
Figure 8:
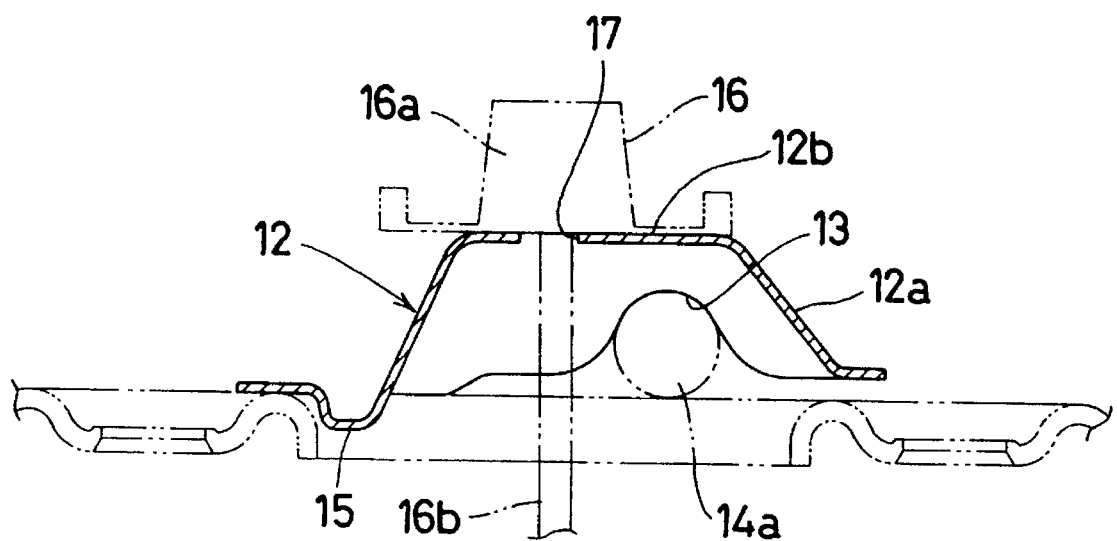
FIG. 8 is a sectional view taken along the line B—B of FIG. 5.
Figure 9:
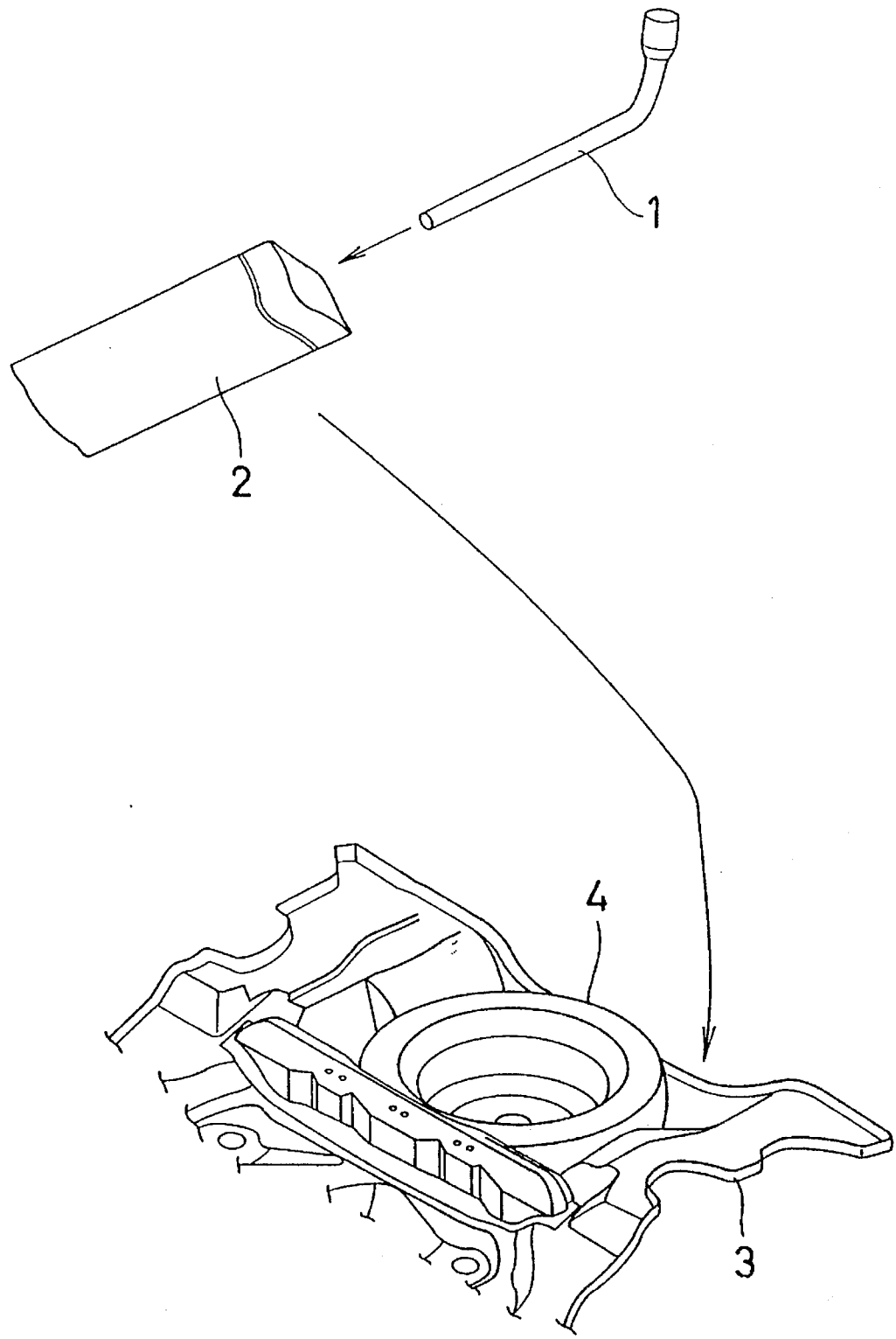
FIG. 9 is a perspective view showing a conventional method for storing an automotive tool.

The wheel wrench holder 12 has a ridge 15 protruding downward at the lower part thereof. The ridge 15 is formed into substantially arcuate shape as shown in FIG. 5.

Moreover, the wheel wrench holder 12 has a flat top surface 12b for receiving a body 16a of a spare tire holder 16 at the upper part thereof.

Substantially at the center of the wheel wrench holder 12, a hole 17 for inserting a threaded portion 16b of the spare tire holder 16 is formed.

On the other hand, a rear floor 18 of an automobile 10 has a concave portion 20 for storing a spare tire 19. Substantially at the center of the bottom of the concave portion 20, a spare tire bracket 21 is provided.

The spare tire bracket 21 has an internally threaded hole 21a to which the threaded portion 16b of the spare tire holder 16 is screwed.

Next, the operation of this embodiment will be explained, and the configuration of the device of this embodiment will be made apparent.

First, the spare tire 19 is positioned in the concave portion 20 of the rear floor 18.

Then, the threaded portion 16b of the spare tire holder 16 is allowed to pass through the hole 17 of the wheel wrench holder 12, and the handle portion 14a of the wheel wrench 14 is set in the lower concave portion 13 of the wheel wrench holder 12 (refer to FIGS, 1 to 4).

Figure 3:
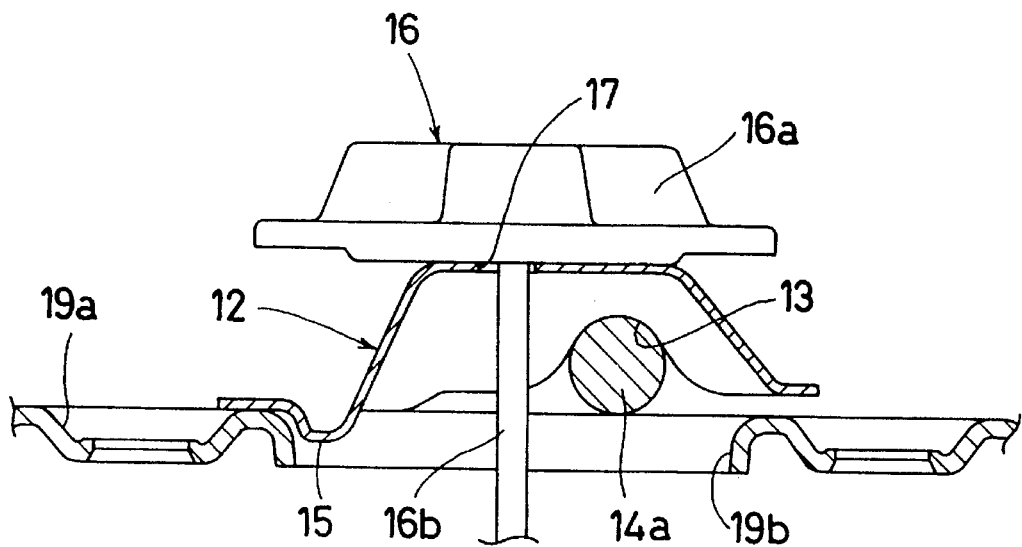
FIG. 3 is an enlarged sectional view showing the part enclosed with a circle shown by arrow A in FIG. 2.
Figure 4:
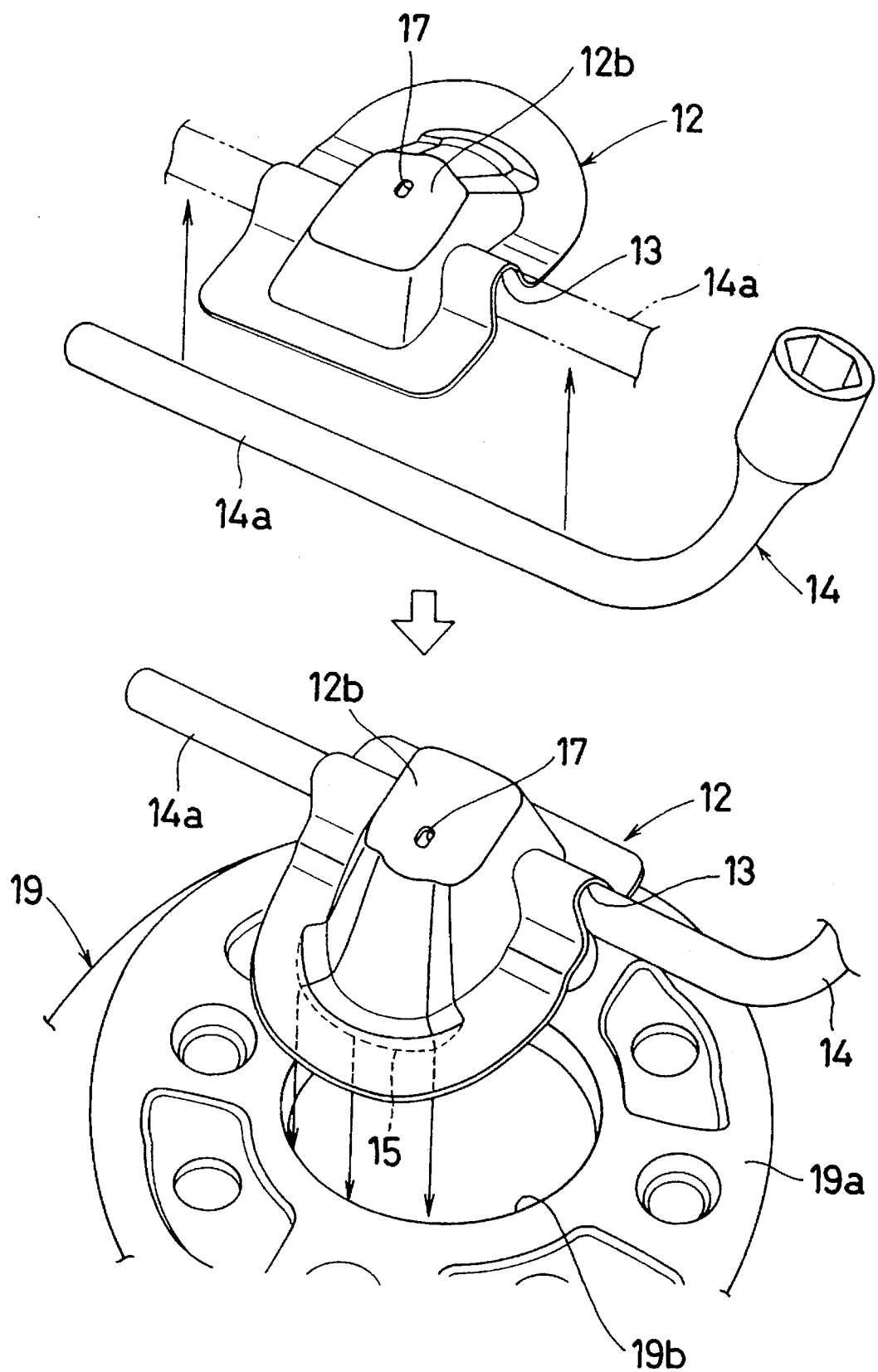
FIG. 4 is an exploded perspective view showing a procedure for fixing a tool in one embodiment of an automotive tool storage device in accordance with the present invention.

Subsequently, the threaded portion 16b of the spare tire holder 16 is screwed into the internally threaded hole 21a of the spare tire bracket 21 while the lower ridge 15 of the wheel wrench holder 12 is engaged with a hole 19b in a wheel hub 19a of the spare tire 19 (refer to FIGS. 3 and 4).

Thereupon, the wheel wrench 14, together with the spare tire 19, is held between the wheel wrench holder 12 and the spare tire 19 and fixed. Therefore, the wheel wrench 14 does not move freely during the running of the automobile 10, so that the occurrence of noise and the damage to the nearby parts can be prevented.

In the above embodiment, the lower ridge 15 of the wheel wrench holder 12 is formed so as to fit the diameter of the hole 19b of the wheel hub 19a. Therefore, the spare tire can be fixed by the wheel wrench holder only without the wheel wrench 14.

Also, in this embodiment, the lower ridge 15 of the wheel wrench holder 12 is formed so as to engage with the hole 19b of the wheel hub 19a to fit the shape of the hole 19b. Therefore, a tire of any type, which has the same diameter of the hole 19b, can be fixed.

Moreover, in the above embodiment, a wheel wrench 14 is used as a tool, but the tool is not limited to a wheel wrench; any type of tool may be used.

As described above, according to the automotive tool storage device in accordance with the present invention, in the automotive tool storage device in which the spare tire is fixed to the car body by using the spare tire holder, the tool is fixed together with the spare tire by using the tool holder having the concave portion which is open downward at the lower part thereof, by positioning the tool in the concave portion of the tool holder, and by holding the tool between the wheel hub of the spare tire and the tool holder. Thereby, the following effects can be achieved.

In the present invention, the tool can be fixed to the car body by using the existing fixing device for fixing the spare tire, so that there is no need for installing another special-purpose tool fixing device.

Also, the tool is fixed above the spare tire together with the spare tire, so that a space for a tool only need not be provided specially, resulting in simple construction and economical configuration.

Further, since the tool is fixed, the tool does not move during the running of the automobile. Therefore, the tool does not cause noise and damage to the nearby parts.

Still further, in the present invention, the tool is fixed to a fixed position above the spare tire, so that the need for looking for the tool when it is required can be eliminated, and the tool can be used immediately, which is convenient in use of tool.

I claim:

1. An automotive tool storage device for use with a spare tire having a wheel hub fixable to an automobile rear floor, said storage device comprising:

a spare tire holder having a threaded portion in connection therewith and adapted to project downwardly through the wheel hub and toward the automobile rear floor and a spare tire bracket adapted to be connected with the automobile rear floor for connection with the threaded portion for fixing the spare tire to the rear floor;

a tool; and a tool holder disposed below the spare tire holder and adapted to be disposed above the wheel hub, said tool holder having a hole formed therein permitting said threaded portion of said spare tire holder to be inserted therethrough, said tool holder further comprising a concave portion formed therewith and opening downwardly toward the wheel hub, wherein, in use, said threaded portion of said spare tire holder is inserted through said hole of said tool holder, said tool is situated in said concave portion of said tool holder and said threaded portion is fixed to said spare tire bracket such that said tool is adapted to bear against the wheel hub and said tool is clamped inside said concave portion between said tool holder and the wheel hub.

2. An automotive tool storage device, as claimed in claim 1, wherein said tool holder is provided with a projection at a lower part adapted to engage a hole in the wheel hub of the spare tire.

3. An automotive tool storage device, as claimed in claim 1 or 2, wherein said tool is a wheel wrench.

* * * * *